United States Patent
Stanfill et al.

[11] Patent Number: 6,088,716
[45] Date of Patent: Jul. 11, 2000

[54] METHOD FOR PREVENTING BUFFER DEADLOCK IN DATAFLOW COMPUTATIONS

[75] Inventors: Craig W. Stanfill, Waltham; Clifford A. Lasser, Cambridge, both of Mass.

[73] Assignee: Ab Initio Software Corporation, Concord, Mass.

[21] Appl. No.: 08/847,909

[22] Filed: Apr. 28, 1997

[51] Int. Cl.[7] .................................................. G06F 15/82
[52] U.S. Cl. ........................ 709/106; 709/104; 709/107
[58] Field of Search ............................ 395/873, 876, 395/877, 677, 200.61; 345/302; 710/53, 52, 56, 57, 200, 220, 240; 709/107, 231

[56] References Cited

U.S. PATENT DOCUMENTS

| | | | |
|---|---|---|---|
| 4,298,954 | 11/1981 | Bigelow et al. | 364/900 |
| 5,204,965 | 4/1993 | Guthery et al. | 395/800 |
| 5,487,167 | 1/1996 | Dinallo et al. | 396/650 |
| 5,568,614 | 10/1996 | Mendelson et al. | 395/200.08 |
| 5,684,953 | 11/1997 | Hummel | 395/200.01 |
| 5,790,893 | 6/1998 | Polge et al. | 395/873 |

OTHER PUBLICATIONS

UNIX System Laboratories, Programmer's Guide: Streams, pp. 2–9 to 2–19, 1992.

F. Lau et al, "Propagating Buffer: a New Approach to Deadlock Freedom in Store–and–forward Networks", IEEE, pp. 804–807, 1991.

M. Coli, et al, "An Adaptive Deadlock and Livelock Free Routing Algorithm", IEEE, pp. 288–295, 1995.

M. Ade, et al, "Buffer Memory Requiremetns in DSP Applications", IEEE, pp. 108–123, 1994.

*Primary Examiner*—Majid A. Banankhah
*Assistant Examiner*—Sue Lao
*Attorney, Agent, or Firm*—Fish & Richardson, P.C.

[57] ABSTRACT

A buffer deadlock prevention technique for dataflow computations. The invention that implements the following algorithm: (1) providing a supplemental buffer for each input of a "downstream" program; (2) partitioning the inputs of each downstream program into disjoint input sets, such that two inputs are in the same input set if and only if such inputs come, either directly or indirectly, from a common upstream program; (3) attempting to read data into a downstream program from an "upstream" program via an input I in an input set; (4) if no data is currently available from input I, and if any other input J in the same input set has data available, then reading into the downstream program available data from each such input J and storing such that data in the supplemental buffer corresponding to such input J until such time as available data is exhausted on all such inputs J or data becomes available on input I.

10 Claims, 5 Drawing Sheets

Dataflow Graph

Deadlock

METHOD FOR PREVENTING BUFFER DEADLOCK IN DATAFLOW COMPUTATIONS

BACKGROUND

1. Field of the Invention

This invention relates to data processing, and more particularly to complex dataflow computations.

2. Description of Related Art

Complex data processing applications may be assembled from components by linking the outputs and inputs of various processing stages by means of communications channels (e.g., TCP/IP). In general, such communication channels provide limited data buffering capacity. When a channel's buffer space is exhausted, the channel will 'block,' such that it is not possible to write additional data to the channel. In most cases, blockage is harmless, e.g., when the output of a fast program is connected to the input of a slower program. Under such circumstances, the finite buffering capacity of the communication channel serves to regulate computation such that the faster program does not get too far ahead of the slower program.

However, under certain circumstances, channel blockage can lead to a form of system failure called a 'deadlock'. FIGS. 1 and 2 are dataflow diagrams showing a simple example of channel blockage. Suppose a first, "upstream" program 100 produces two outputs 101, 102, and a second, "downstream" program 103 requires two inputs 104, 105. Further, suppose that the outputs of the upstream program 100 are linked to the inputs of the downstream program 103 by two communication channels 106, 107.

In the course of the computation, the following set of circumstances may occur, as illustrated in FIG. 2:

The upstream program 100 wishes to write data to its first output 101.

The downstream program 103 wishes to read data from its second input 105.

The first communication channel 106 is full (its buffer space is fully committed).

The second communication channel 107 is empty (it contains no untransmitted data).

Neither the upstream program 100 nor the downstream program 103 can make any further progress, and thus the computation will never complete. This situation is generally known as a deadlock; in the context of this discussion it will be called a 'buffer deadlock.

Since the possibility of a buffer deadlock may lead to application failure, a method for preventing buffer deadlocks in dataflow computations would be very useful. The present invention provides a solution to this problem.

SUMMARY

The invention encompasses a buffer deadlock prevention technique for dataflow computations that implements the following algorithm:

Any "downstream" program having more than one input I is provided with a pool of supplemental buffer space. In the preferred embodiment, each input I is associated with a "deferred input queue" which may refer to a sequence of data blocks in the supplemental buffer space.

The inputs of each downstream program are partitioned into disjoint input sets, such that two inputs are in the same partition if and only if they obtain their input, either directly or indirectly, from a common "upstream" program.

If a downstream program needs to read data from an upstream program via some input I for which no data is available, AND if any other input J in the same input set has data available, THEN the downstream program continuously reads available data from each such input J and stores that data in a supplemental buffer corresponding to such input J until such time as available data is exhausted on all such inputs J OR data becomes available on the desired input I. In the preferred embodiment, this is done by allocating a block of storage from the supplemental buffer, filling that storage block with data, and adding the storage block to the deferred input queue. If the supplemental buffer becomes full, the downstream program aborts rather than risk a deadlock.

If the downstream program needs to read data from some input I which has data in the supplemental buffers, then data is extracted from the supplemental buffers instead of from the corresponding communication channel.

The details of one or more embodiments of the invention are set forth in the accompanying drawings and the description below.

DESCRIPTION OF DRAWINGS

Like reference numbers and designations in the various drawings indicate like elements.

DETAILED DESCRIPTION

Figure 1:
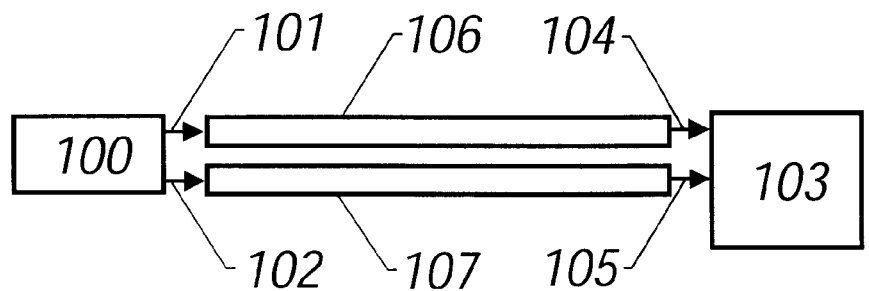
FIGS. 1 and 2 are dataflow diagrams showing a simple example of channel blockage under the prior art.
Figure 2:
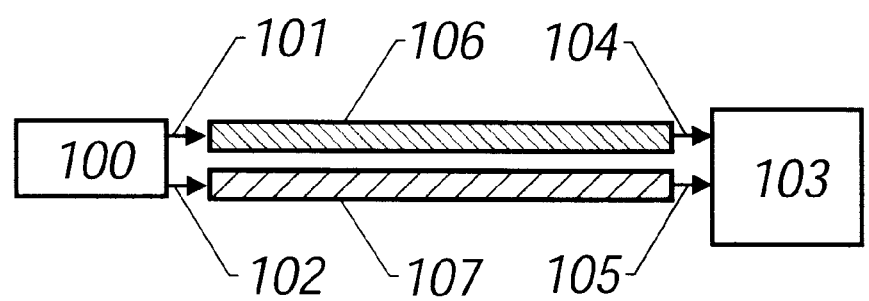
Figure 3:
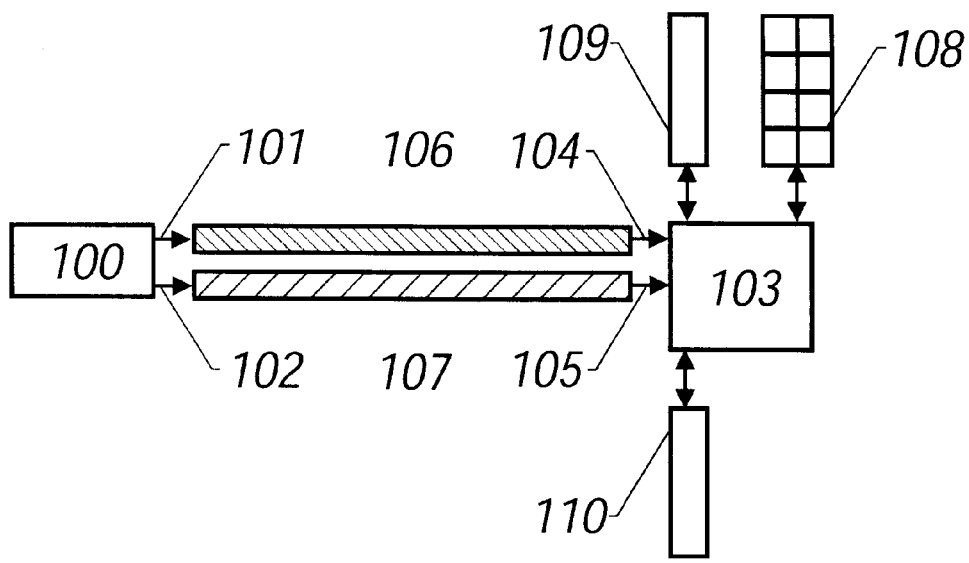
FIGS. 3, 4, 5 and 6 are a sequence of dataflow diagrams showing an embodiment of a buffer deadlock prevention technique in accordance with the invention.

FIGS. 3, 4, 5 and 6 are a sequence of dataflow diagrams showing an embodiment of a buffer deadlock prevention technique in accordance with the invention. Buffer deadlocks of the type shown in FIG. 1 may be prevented by implementing the following algorithm:

Any "downstream" program 103 having more than one input 104, 105 is provided with a pool of supplemental buffer space 108, which is typically a combination of primary (e.g., RAM) and secondary (e.g., disk) storage (FIG. 3). In the preferred embodiment, each input 104, 105 is associated with a "deferred input queue" 109, 110 which may refer to a sequence of data storage blocks in the supplemental buffer space 108. In the preferred embodiment, the deferred input queues 109, 110 are configured as first-in first-out (FIFO) queues.

Figure 4:
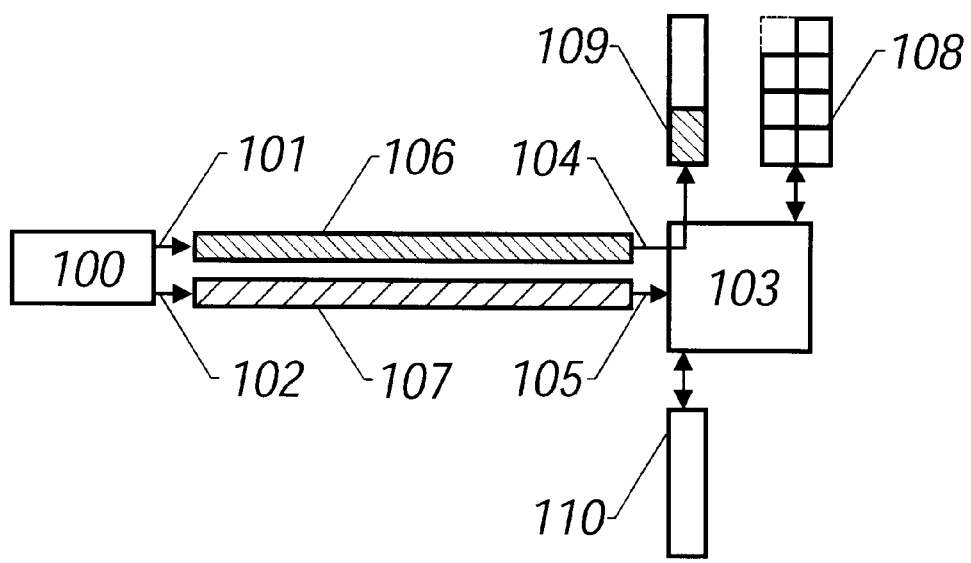
Figure 5:
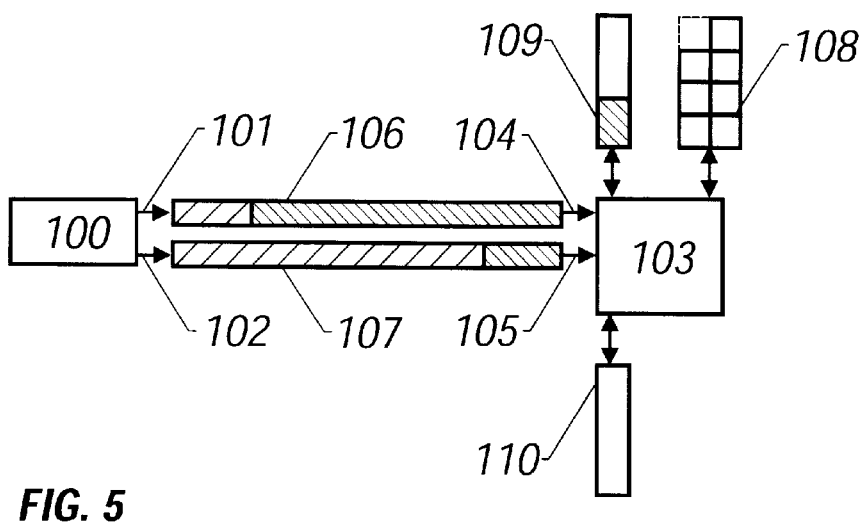

If a downstream program 103 needs to read data from an "upstream" program 100 via some input 105 for which no data is available, AND if data is available on one or more of the other inputs 104 to the downstream program 103, THEN the downstream program 103 continuously reads available data from each input 104 and stores that data in corresponding storage blocks allocated from the supplemental buffer space 108 (FIG. 4)

until such time as available data is exhausted on all other inputs 104 OR data becomes available on the desired input 105 (FIG. 5). In the preferred embodiment, buffer allocation includes allocating a storage block from the supplemental buffer space 108, filling that storage block with data, and adding a reference to the storage block to the deferred input queue 109. If the supplemental buffer space 108 becomes full, and more data must be buffered, the downstream program 103 will abort rather than risk a deadlock.

Figure 6:
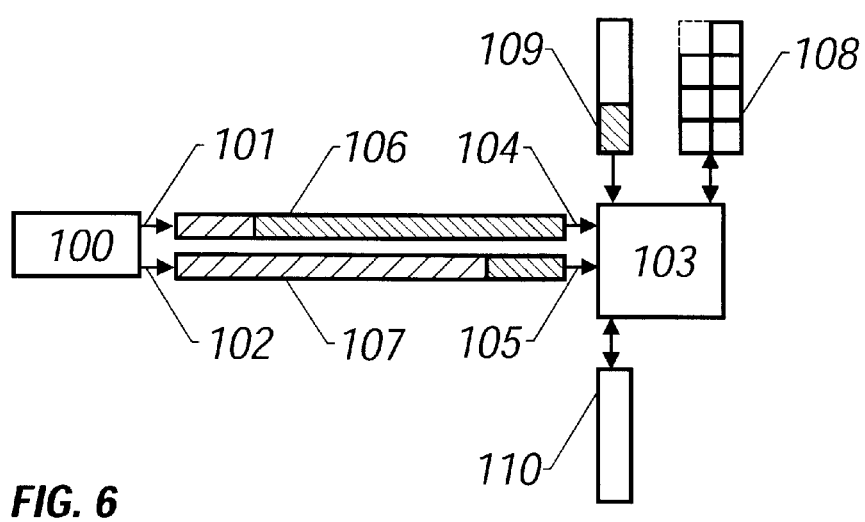

If the downstream program 103 needs to read data from some input 104 which has data in its deferred input queue 109, then data is extracted from storage blocks referenced by the deferred input queue 109 instead of from the corresponding communication channel 106 (FIG. 6). When the data from a storage block has been consumed, the storage block is returned to the supplemental buffer space 108.

Figure 7:
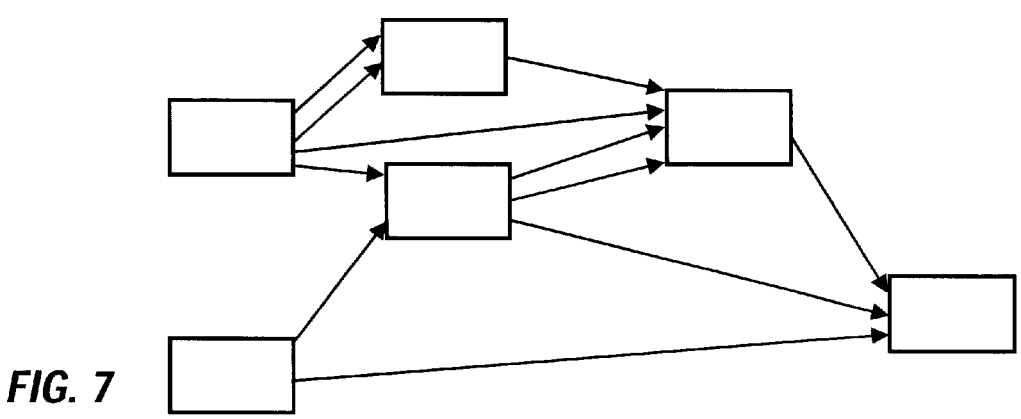
FIG. 7 is a more complex dataflow graph to which the invention can be applied.

Although this solution has been illustrated for the simple case of two programs 100, 103 connected by a pair of communication channels 106, 107, it applies to all acyclic dataflow graphs, regardless of the number of communication channels and programs, and regardless of the complexity of the graph's connectivity; see, for example, FIG. 7, which is a more complex dataflow graph to which the invention can be applied.

Figure 8:
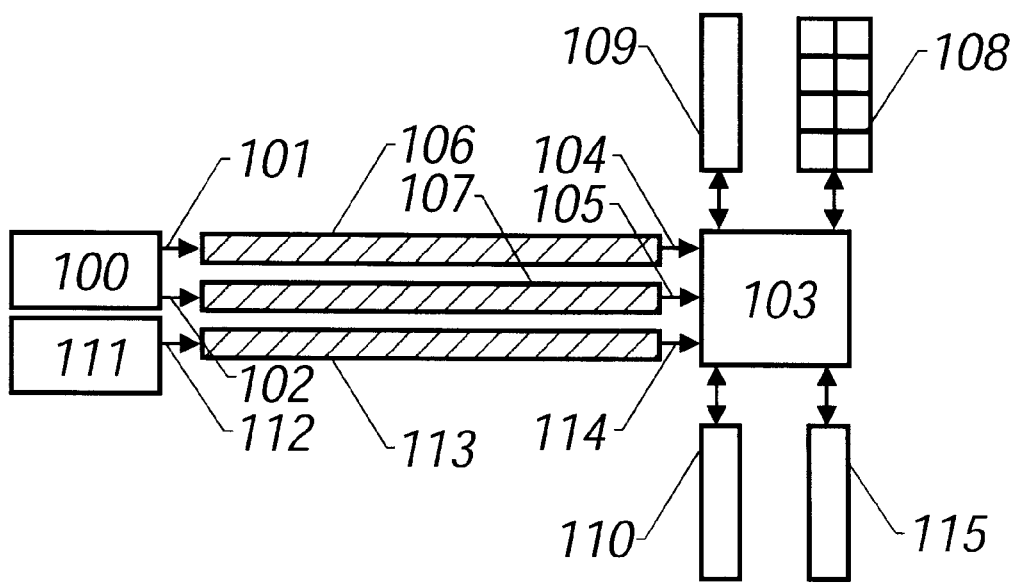
FIGS. 8, 9 and 10 are a sequence of dataflow diagrams showing an embodiment of a buffer deadlock prevention technique for multiple data producing nodes, in accordance with the invention.

One practical problem with the method as outlined above is that it will sometimes buffer data unnecessarily when used with multiple data producing nodes. Suppose, for example, that the example in FIG. 3 is extended as shown in FIG. 8 by adding an additional upstream program 111 having a single output 112, by adding a new input 114 to the downstream program 103, and by connecting the single output 112 to the new input 114 with a new communication channel 113, and adding a deferred input queue 115 in accordance with the method discussed above. Further, suppose that the new program 111 produces data at a much slower rate than the old program 100.

Figure 9:
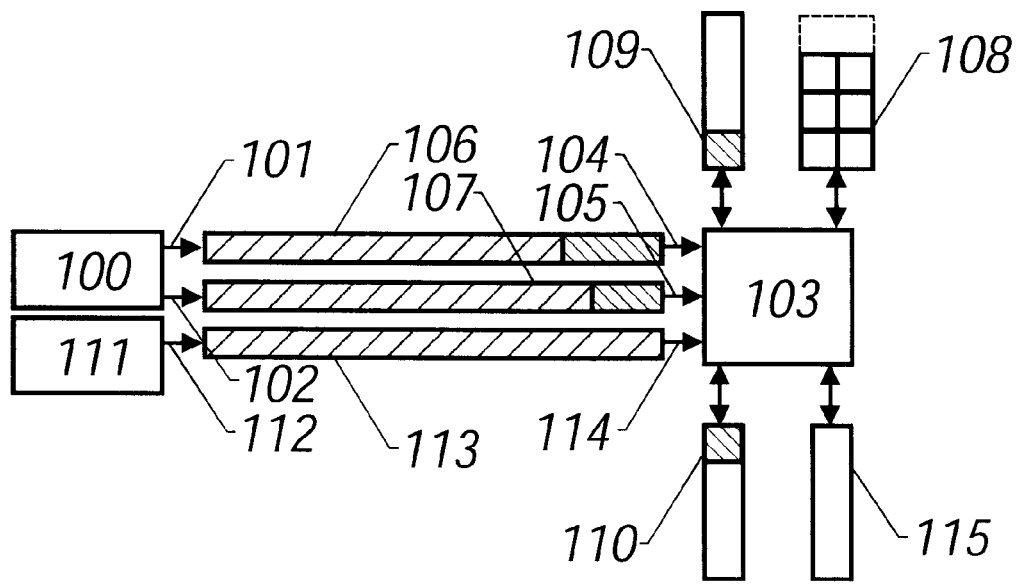

Owing to the fact that the double-channel upstream program 100 produces data much faster than the single-channel upstream program 111, the downstream program 103 will often find that data is available on one of the input channels 106 or 107 from the faster upstream program 100, but not on the channel 113 from the slower upstream program 111. In accordance with the procedure noted above, the downstream program 103 will consume the available input data on channels 106 or 107 and store that data in one of the deferred input queues 109 or 110, as shown in FIG. 9.

Figure 10:
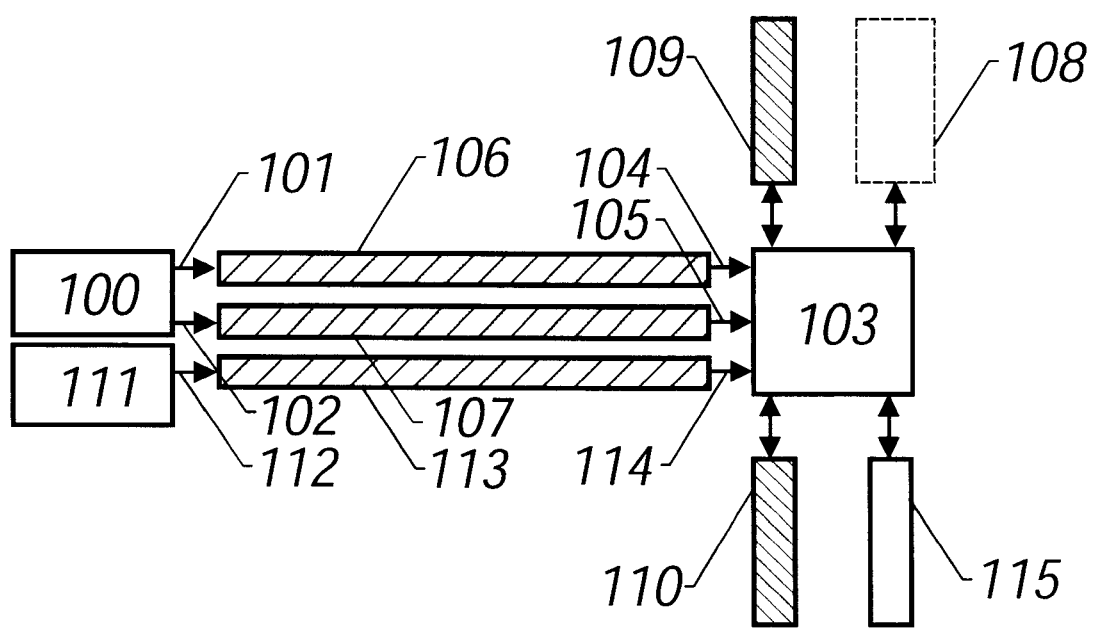

Eventually, the supplemental buffer space 108 may become exhausted, as shown in FIG. 10, so that the downstream program 103, believing that a deadlock is imminent, may be forced to abort execution. This is an unfortunate result of the fact that the algorithm described above is using the supplemental buffer space 108 to make up for the difference in speed between the data producing programs 110 and 111 rather than to prevent a deadlock.

The solution to this problem is to recognize that a deadlock is possible only in cases where two or more inputs share a common upstream process; this difference serves to distinguish a deadlock-prone computation (FIG. 1) from a deadlock-free computation.

The preferred method for overcoming this circumstance is as follows:

Partition the inputs of each downstream program into disjoint subsets or partitions, such that two inputs are in the same partition if and only if they obtain their input, either directly or indirectly, from a common source program; call each such partition an "input set".

Modify the procedure described above for saving data to a deferred input queue to include a "diverted input" procedure as follows: If a program wants to read from an input I for which there is no data available, and any other input J in the same input set has data available, then the program must read data from input J and store the result in a deferred input queue for input J.

In the case of FIG. 8, the downstream program 103 has two input sets: {104, 105} and {114}. Suppose the downstream program 103 encounters a situation where it wishes to read from input 114, but data is available only on input 104 or 105, as shown in FIG. 9. Because inputs 104 and 105 are not in the same input set as input 114, their data is not diverted to the deferred input queues 109 or 110; instead, the downstream program 103 waits until upstream program 111 produces data on channel 113, at which time the downstream program 103 reads that data and continues normally.

Suppose, on the other hand, that the downstream program 103 wishes to read from input 105, and data is available on input 104 but not on input 105. In this case, the diverted input procedure is invoked, due to the fact that inputs 104 and 105 are in the same input set. The data available on input 104 is buffered for later access. The configuration shown in FIG. 3 is also covered by the diverted input procedure because both inputs 104, 105 belong to one input set.

The input sets can be found by a preferred algorithm. For this algorithm, any of the well known methods for representing sets, such as a bit-vector or a linked list, can be used, as well as any of the well known methods for computing the union and intersection of such sets.

1. Associate a set of upstream programs with each communication channel and with each program. Each such set is initially empty. If C is a communication channel, then C.upstream stands for the set of programs upstream from C. If P is a program, then P.upstream stands for the set of programs upstream from P.
2. Associate a list of input sets with each program. If P is a program, then P.inputsets stands for the input sets associated with P.
3. Create a topologically sorted list of programs, such that if one program P2 consumes the input produced by a second program P1, then P1 comes before P2 in the list. If no such topologically sorted list can be created, then exit the algorithm, indicating that the computation cannot be guaranteed to be deadlock-free.
4. Traverse this list of programs, from first to last, performing the following operations on each program P:
    (a) Create an empty list L. Each entry of L consists of a set of inputs and a set of upstream programs. L[i].inputs stands for the input set of the $i^{th}$ entry in L. L[i].upstream stands for the upstream program set of the $i^{th}$ entry in L.
    (b) For each of P's inputs I:
        (1) Let C be the input channel attached to I.
        (2) For each element L[i] in L:
            (A) If L[i].upstream's intersection with C.upstream is non-empty, then set L[i].upstream=L[i].upstream ∪C.upstream, add I to L[i].inputs, and go on to the next input I.
            (B) If no element L[i] is identified by the above step, then add a new element L[i] such that L[i].upstream=C.upstream, and L[i].inputs ={I}.
    (c) For each element L[i] in L, set P.inputsets=P.inputsets+L[i].inputs.
    (d) For each communication channel C which is connected to one of P's inputs, P.upstream=P.upstream ∪C.upstream.

(e) For each communication channel C which is connected to one of P's outputs, C.upstream= P.upstream∪{P}.

As an example, based on the configuration shown in FIG. 8, start by initializing the upstream process sets for the three programs 100, 103 and 111 and for the three communication channels 106, 107, 113. Create a set of input sets for each program; this gives the following state:

| Object | upstream | inputsets |
|---|---|---|
| 100 | {} | {} |
| 103 | {} | {} |
| 106 | {} | |
| 107 | {} | |
| 111 | {} | {} |
| 113 | {} | |

Topologically sort the programs producing, as one possibility, the following list: (100, 111, 103).

First process upstream program 100. It has no inputs, so 100.inputsets and 100.upstream remain empty. The outputs of upstream program 100 are connected to channels 106 and 107, so set 106.upstream and 107.upstream to {100}. This gives the following state:

| Object | upstream | inputsets |
|---|---|---|
| 100 | {} | {} |
| 103 | {} | {} |
| 106 | {100} | |
| 107 | {100} | |
| 111 | {} | {} |
| 113 | {} | |

Next, process upstream program 111 (the next program in the topologically sorted list). Upstream program 111 has no inputs, so 111.inputsets remains empty. Upstream program 111 has a single output connected to channel 113, so 113.upstream={111}. This yields the following state:

| Object | upstream | inputsets |
|---|---|---|
| 100 | {} | {} |
| 103 | {} | {} |
| 106 | {100} | |
| 107 | {100} | |
| 111 | {} | {} |
| 113 | {111} | |

Finally, process downstream program 103. It reads from three inputs: 104, 105, 114. The algorithm produces the following steps:

L is initialized to be empty

Consider the first input I=104, which is connected to channel C=106. Since L is empty, no element L[i] exists such that L[i].upstream intersects with C.upstream. Thus, create a new entry in L consisting of C.upstream and {I}, resulting in L=({100}, {104})

Next, consider the second input I=105, which is connected to channel C=107.

L[1].upstream={100} and C.upstream={100}. These two sets overlap (in fact, they happen to be identical), so add C.upstream to L[1].upstream, and add I to L[I].inputs, resulting in L=({100}, {104, 105}).

Finally, consider the third input I=114, which is connected to channel C=113. C.upstream={111}, and no element L[i].upstream intersects with C.upstream, so create a new entry in L consisting of C.upstream and {I}. This results in L=({100}, {104, 105}), ({111}, {114})

Collect the input sets from L; that is, 103.inputsets= {{104, 105}, {114}}

Finally, consider each input channel C connected to program 103, and compute the union of their upstream sets. The result is stored in P.upstream; that is, 103.upstream={100, 111}. This yields the following final state:

| Object | upstream | inputsets |
|---|---|---|
| 100 | {} | {} |
| 103 | {100, 111} | {{104, 105}, {114}} |
| 106 | {100} | |
| 107 | {100} | |
| 111 | {} | {} |
| 113 | {111} | |

Any algorithm which computes the same result may be used. Furthermore, it is possible for a human to inspect the computation and manually assign input sets.

A number of embodiments of the present invention have been described. Nevertheless, it will be understood that various modifications may be made without departing from the spirit and scope of the invention. For example, other buffer allocation schemes may be used for the supplemental buffers. Accordingly, it is to be understood that the invention is not to be limited by the specific illustrated embodiment, but only by the scope of the appended claims.

What is claimed is:

1. A method for buffer deadlock prevention for dataflow computations comprising the steps of:
   (a) providing a supplemental buffer for each input of a downstream program;
   (b) partitioning the inputs of each downstream program into disjoint input sets, such that two inputs are in the same input set if and only if such inputs come, either directly or indirectly, from a common upstream program;
   (c) attempting to read data into a downstream program from an upstream program via an input I in an input set;
   (d) if no data is currently available from input I, and if any other input J in the same input set has data available, then reading available data from each such input J and storing such data in the supplemental buffer corresponding to such input J until such time as available data is exhausted on all such inputs J or data becomes available on input I.

2. The method of claim 1, further including the step of aborting the downstream program if any supplemental buffer becomes full and more data must be stored.

3. The method of claim 1, further including the steps of reading stored data into the downstream program from the supplemental buffer corresponding to an input I before directly reading data from the input I.

4. The method of claim 1, further including the steps of providing a pool of storage blocks, allocating each supplemental buffer from one or more storage blocks, and referencing each allocated supplement buffer in a deferred input queue.

5. The method of claim 4, further including the steps of reading stored data into the downstream program from the storage blocks of the supplemental buffer corresponding to an input I before directly reading data from the input I, and returning each read storage block to the pool of storage blocks.

6. A computer program, residing on a computer-readable medium, for buffer deadlock prevention for dataflow computations, comprising instructions for causing a computer to:

(a) provide a supplemental buffer for each input of a downstream program;

(b) partition the inputs of each downstream program into disjoint input sets, such that two inputs are in the same input set if and only if such inputs come, either directly or indirectly, from a common upstream program;

(c) attempt to read data into a downstream program from an upstream program via an input I in an input set;

(d) if no data is currently available from input I, and if any other input J in the same input set has data available, then read available data from each such input J and store such data in the supplemental buffer corresponding to such input J until such time as available data is exhausted on all such inputs J or data becomes available on input I.

7. The program of claim 6, further comprising instructions for causing a computer to abort the downstream program if any supplemental buffer becomes full and more data must be stored.

8. The program of claim 6, further comprising instructions for causing a computer to read stored data into the downstream program from the supplemental buffer corresponding to an input I before directly reading data from the input I.

9. The program of claim 6, further comprising instructions for causing a computer to provide a pool of storage blocks, allocate each supplemental buffer from one or more storage blocks, and reference each allocated supplement buffer in a deferred input queue.

10. The program of claim 9, further comprising instructions for causing a computer to read stored data into the downstream program from the storage blocks of the supplemental buffer corresponding to an input I before directly reading data from the input I, and return each read storage block to the pool of storage blocks.

* * * * *